United States Patent
Vigneras

(10) Patent No.: US 9,390,865 B2
(45) Date of Patent: Jul. 12, 2016

(54) DEVICE AND METHOD FOR THE FRICTION-STIR WELDING OF AN ASSEMBLY FOR STORING ELECTRICITY

(75) Inventor: Erwan Vigneras, Quimper (FR)

(73) Assignee: BLUE SOLUTIONS, Ergue Gaberic (FR)

( * ) Notice: Subject to any disclaimer, the term of this patent is extended or adjusted under 35 U.S.C. 154(b) by 203 days.

(21) Appl. No.: 14/112,533

(22) PCT Filed: Apr. 19, 2012

(86) PCT No.: PCT/EP2012/057112
§ 371 (c)(1),
(2), (4) Date: Oct. 17, 2013

(87) PCT Pub. No.: WO2012/143414
PCT Pub. Date: Oct. 26, 2012

(65) Prior Publication Data
US 2014/0045039 A1 Feb. 13, 2014

(30) Foreign Application Priority Data
Apr. 20, 2011 (FR) ...................................... 11 53430

(51) Int. Cl.
*H01G 9/26* (2006.01)
*B23K 20/12* (2006.01)
*H01M 2/20* (2006.01)
*H01G 11/10* (2013.01)
*H01M 2/02* (2006.01)

(52) U.S. Cl.
CPC .............. *H01G 9/26* (2013.01); *B23K 20/1265* (2013.01); *H01G 11/10* (2013.01); *H01M 2/20* (2013.01); *H01M 2/202* (2013.01); *B23K 2201/38* (2013.01); *H01M 2/022* (2013.01); *H01M 2/0285* (2013.01)

(58) Field of Classification Search
CPC ... H01M 2/202; H01M 2/022; H01M 2/0285; H01G 9/26; H01G 11/10
USPC .......................... 429/158; 228/112.1; 361/434
See application file for complete search history.

(56) References Cited

U.S. PATENT DOCUMENTS

| 2006/0032667 A1* | 2/2006 | Sato .............................. 174/260 |
| 2010/0167094 A1* | 7/2010 | Geshi et al. ....................... 429/1 |
| 2011/0081568 A1 | 4/2011 | Kim et al. |
| 2011/0086255 A1* | 4/2011 | Maxwell ............... H01M 2/105 429/96 |

FOREIGN PATENT DOCUMENTS

| DE | 102006050709 B3 | 5/2008 |
| FR | 2915626 A1 | 10/2008 |

* cited by examiner

*Primary Examiner* — Karie O'Neill Apicella
(74) *Attorney, Agent, or Firm* — Blakely Sokoloff Taylor & Zafman LLP

(57) ABSTRACT

The invention relates to a method for connecting two energy storage assemblies (10) together, each energy storage assembly including a sealed metal housing, in which: a connector strip (30), which is sized so as to contact the end surface of each of the housings, is positioned on the end surfaces (24) of two housings arranged side by side; and the strip is friction-stir welded to each of the housings.

10 Claims, 3 Drawing Sheets

DEVICE AND METHOD FOR THE FRICTION-STIR WELDING OF AN ASSEMBLY FOR STORING ELECTRICITY

The present invention concerns the technical field of electric energy storage assemblies.

In the invention by "electric energy storage assembly" is meant either a capacitor (i.e. a passive system comprising electrodes and an insulator) or a supercapacitor (i.e. a passive system comprising at least two electrodes, an electrolyte and at least one separator) or a battery (i.e. a system comprising an anode, a cathode, and an electrolyte solution between the anode and the cathode) e.g. of lithium battery type.

Said energy storage assemblies are most often associated in energy storage modules allowing specifications to be met that are specific to some applications.

STATE OF THE ART

In the state of the art an energy storage module is known comprising a plurality of energy storage assemblies, each energy storage assembly being contained in a cylindrical housing. The cylindrical housings are placed side by side in the module and are electrically connected together, in series, by connector strips.

Each connector strip is placed on one of the substantially planar end walls of the cylinder and on the corresponding end wall of the neighbouring cylinder.

In the state of the art the connector strip is welded onto each housing by a LASER welding process as described in document FR 2 915 626 for example.

LASER welding is transparency welding which creates a highly localized melt point in the two materials to be welded. The molten materials then mix together and the assembly solidifies again almost instantly having regard to the highly localised nature of the melt. However the forming of the weld depends on the fine-tuned adjusting of a plurality of parameters in particular the focus of the laser, the power thereof, etc.

Yet the connection of the housing of an energy storage assembly with the connector strip is performed after the electrolyte has been placed in the housing and the impregnation hole has been re-plugged. It is therefore most important to maintain the seal of the housing otherwise impurities may be added to the electrolyte of the storage assembly and substantially reduce its lifetime and even lead to the discarding thereof.

It has been ascertained that the LASER welding process, on account of the different parameters having an influence on the melting of the zone to be welded, is scarcely repeatable and can lead to piercing of the lid during the melt process if the beam is too powerful or too focused.

To obtain a reliable weld process, it is therefore necessary to provide a housing for the storage assembly that is relatively thick and/or of special design, thereby preventing any slight disturbance of the LASER parameters from deteriorating the seal of the housing, and/or the different LASER parameters used to weld the strip onto the housing of the storage assembly must be monitored using highly accurate means thus entailing a non-negligible increase in manufacturing costs.

It is one objective of the present invention to propose a simple, low-cost method for manufacturing an energy storage module which nevertheless allows maintaining of the seal of each of the energy storage assemblies.

SUMMARY OF THE INVENTION

For this purpose a method is proposed for connecting two energy storage assemblies, each energy storage assembly comprising a sealed housing in which:

on the end surfaces of two housings placed side by side a connector strip is positioned sized so that it is contact with the end surface of each of the housings;

the strip is friction-stir welded onto each of the housings.

In the present invention by "end surface" is meant the upper or lower housing surface intended to lie opposite the strip. For a housing having a longitudinal axis (e.g. a cylindrical housing) the end surfaces are, for example, the surfaces perpendicular to the longitudinal axis of the housing.

Each storage assembly preferably comprises at least two electrodes and an electrolyte. The assemblies may be identical, either of same shape and same type (supercapacitor, battery, etc.) or of different shape and/or type.

Said method is of great advantage. Friction-stir welding is a welding technique in which a tool is very rapidly driven in rotation on the parts to be welded. The tool enters into the material heating it to a paste. Heating associated with stirring allows welding of the constituent material of the parts to be welded. Welding is performed in the paste state and the tool only heats the material with which it comes into contact.

This method is therefore very easy to control since there is no risk of material polluting the electrolyte subsequent to welding if the tool itself does not pass through the housing. Control over the method therefore amounts to verifying the movement of the tool which is easy to perform. It is not necessary either to increase the thickness of the lid to the extent required for LASER welding.

Since welding is performed in the paste state, it will also be noted that there is no risk of hot cracking, which may also deteriorate the seal of the housing.

A method according to the invention therefore allows the connecting together of energy storage assemblies in simple, low-cost manner whilst maintaining the seal of each storage assembly.

The method of the invention also has numerous other advantages.

In particular, it allows electric conduction to be increased between the different energy storage assemblies without requiring any major increase in cycle time.

It is effectively found that with the method of the invention the weld bead corresponds to the size of the stir-welding tool, which is not limited by constraints of tool power unlike the case in the prior art for LASER welding (power largely related to the size of the beam). It is therefore possible to increase the size of the bead or weld points by increasing the size of the tool and hence the electric conduction between the strip and each housing, without the need however to perform several passes of the welding tool on the zone to be welded thereby maintaining a short manufacturing time.

For the same reasons (bead width) the heat conduction from the upper part of the storage assembly towards the strip is improved. The evacuation of heat is therefore optimized by the method of the invention.

In addition, the strip may be more economical being of simpler shape. It is effectively not necessary to hollow out the strip to obtain local reduction of thicknesses as carried out in the prior art to facilitate LASER welding. The use of a non-hollowed strip also allows maximization of the surface of strip in contact with the conducting mat of a module, which also ensures better evacuation of heat towards outside the module.

Finally, the method of the invention is performed by heating the material of the housing to a far lesser extent than in the prior art. The risks of damaging the electrolyte inside the housing or the actual energy storage element are therefore reduced compared with LASER welding.

The method of the invention may also comprise one or more of the following characteristics:

- during the weld step a device mobile in rotation can be placed in contact with the housing and/or strip, and the device is translated along a predetermined axis so that it enters into the material of the housing and/or strip. The axis generally corresponds to the normal to the end surface of the housing. If the housing is a tubular element the predetermined axis generally corresponds to the axis of symmetry of the tubular element;
- each housing may comprise a tubular element and at least one lid closing the tubular element at its end. The housing may particularly comprise two lids, each positioned at one end of the tubular element. Preferably the strip is welded onto the lid. In this case, one surface of the lid forms the end surface of the assembly;
- the strip and the housing can be welded over a distance of at least 1 cm in length, which allows the electric conduction of the assembly to be increased. However it is also possible to perform spot welding of the strip onto the lid;
- the end surface may comprise one or more protuberances forming positioning means for the strip thereupon. The protuberance may be formed for example by a centring pin, the strip then comprising at least one mating orifice; the protuberance may also be formed by one or more pins intended to delimit the contour of the strip;
- the housing and the strip can be superimposed over a contact surface normal to the predetermined axis, in particular the end surface, so that welding passes through the strip to reach the housing;
- the strip and the housing may be in contact upon a contact surface comprising the predetermined axis, so that the strip and the housing are welded edge to edge. In this case, the tool may enter simultaneously into the material of the housing and of the strip. This embodiment is generally applied when the housing comprises a protuberance forming positioning means for the strip;
- the strip may be made in a conductive material, copper in particular;
- the housing may be made at least in part in a metal material, aluminium in particular;
- the end surface of the housing can be made in a first material, the strip being made in a second material different from the first material. With the method of the invention it is effectively possible to have a strip and housing in different materials. Since welding is performed when the material is in a paste state, with the method it is possible without difficulty to weld together two different materials having different properties. In the state of the art it is difficult to weld together two different materials (using the LASER weld technique) particularly if their respective melt temperatures lie fairly distant apart. This is a problem in particular if it is desired to weld aluminium, recommended for manufacturing the housing on account of its properties of rigidity and lightweight, with copper which has excellent electrical conduction properties and able to be given advantageous use for fabricating the strip. Far apart melt temperatures may generate numerous technical difficulties notably including difference in shrinkage which does not allow a reliable, durable weld to be obtained of the two materials. By means of the method of the invention it is possible to optimize the choice of constituent materials of the different parts to be assembled (e.g. copper for the strip, aluminium for the housing) since the method does not add any constraint which would limit this choice.

Similarly, the method of the invention can be used to weld aluminium alloys (6000-series type for example) having advantageous mechanical properties but difficult to weld using the LASER weld method.

A further subject of the invention is a module of at least two energy storage assemblies, each energy storage assembly comprising a sealed housing, the assemblies being connected in pairs by means of a connector strip, conforming to the above-described method.

The weld bead of the strip on the housing is larger than 3 mm, in particular larger than 5 mm in all directions of the plane of the end surface.

BRIEF DESCRIPTION OF THE FIGURES

Other characteristics, objectives and advantages of the present invention will become further apparent from the following description which is solely illustrative and non-limiting and is to be read in connection with the appended drawings in which.

DETAILED DESCRIPTION OF THE INVENTION

A more detailed description will now be given of a method for connecting two assemblies, supercapacitors in particular, according to one embodiment of the invention.

Figure 1:
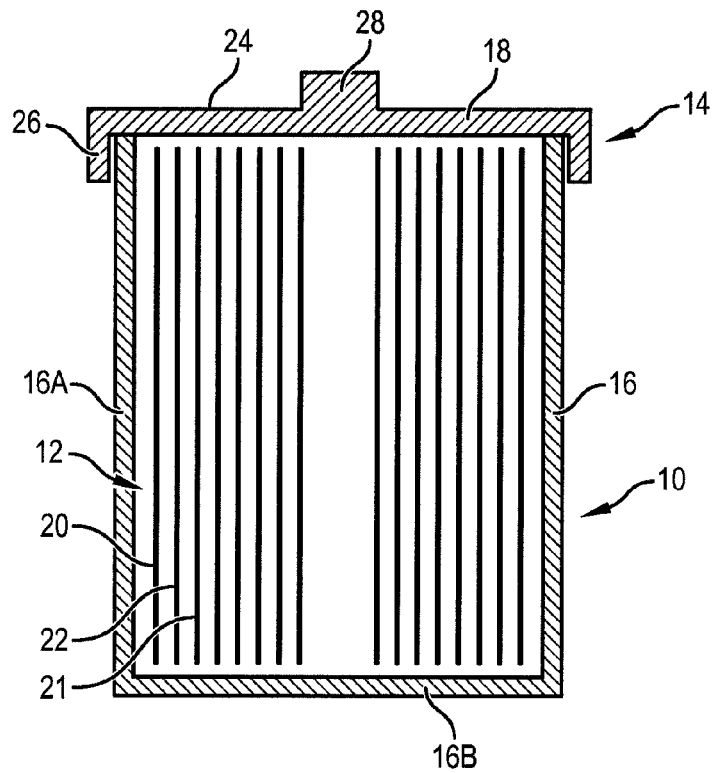
FIG. 1 is radial sectional view of an energy storage assembly of a module according to one embodiment of the invention.

With reference to FIG. 1, an example of embodiment is illustrated of a supercapacitor for which the method of the invention is implemented.

The supercapacitor 10 comprises a winding 12 positioned in a housing 14 which, in the described embodiment, is a casing 16 comprising a cylindrical side wall 16A and a bottom 16B, and a lid 18 capping and closing the casing 16. The housing also contains a liquid electrolyte, not shown in the Figure for reasons of clarity.

The casing 16 and the lid 18 are glued over their entire periphery to ensure the sealing of the supercapacitor. The casing 16 and the lid are generally made in aluminium. They are also electrically insulated from each other by means of the continuous bead of adhesive connecting them together to avoid short-circuiting.

The winding 12 is formed of a unit comprising two foil electrodes 20, 21 and an insulating separator 22 that are superimposed, the separator being inserted between the two foil electrodes 20, 21.

Each foil electrode comprises a collector and an electrode formed of an active material notably containing activated carbon and deposited on the two opposite surfaces of the collector. The collector of each of the electrodes is respectively connected to the casing 16 and to the lid 18, the casing and the lid therefore respectively forming the positive and negative terminals of the energy storage assembly.

The lid 18 comprises an upper surface 24 and a cylindrical turned-over edge 26 following the contour of the casing 16.

The upper surface 24 of the lid and the bottom 16B of the casing form the end surfaces of the housing. The lid also comprises a central protuberance 28 called centring pin in the remainder hereof.

As indicated above, the energy storage assemblies are often assembled in series to form a module dedicated to a particular application. To assemble the different assemblies in series, it is generally necessary firstly to connect the casing 16 of one assembly to at least one adjacent assembly and secondly to connect the lid 18 to another adjacent assembly. The assemblies connected to the terminals of the module are only connected to one adjacent assembly.

Figure 2:
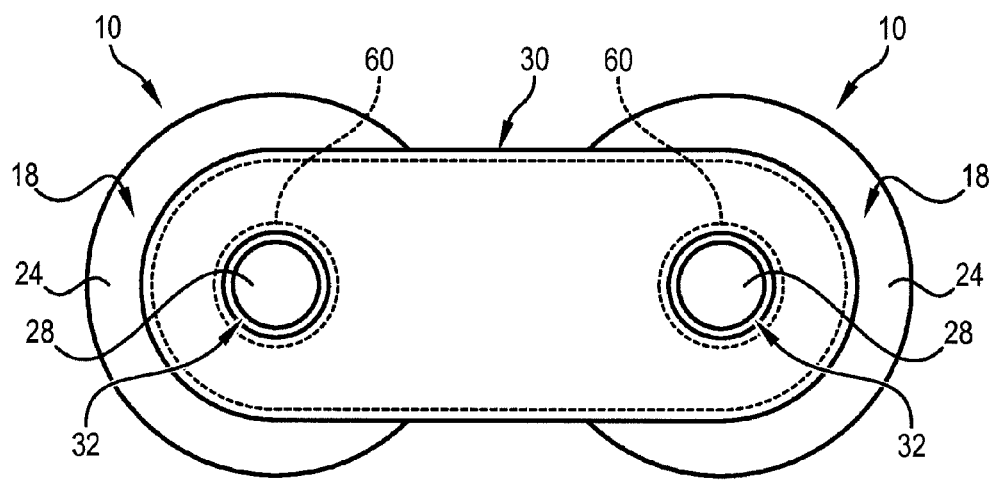
FIG. 2 is an overhead view of a module comprising two energy storage assemblies according to a first embodiment.
Figure 3:
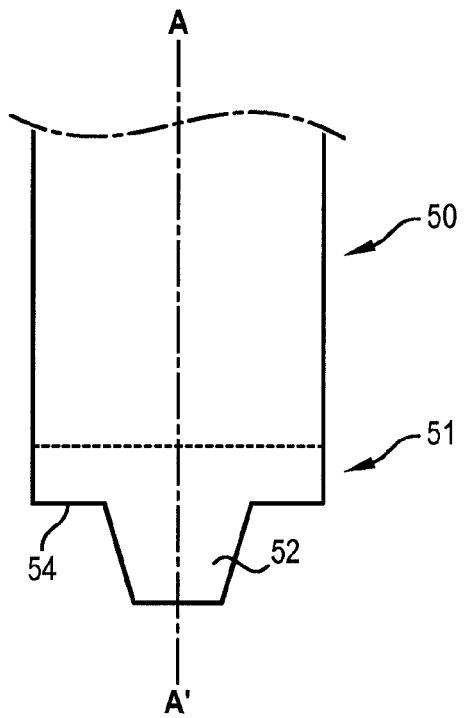
FIG. 3 is a radial sectional illustration of a friction-stir device allowing implementation of the method according to one embodiment of the invention.

FIG. 2 gives an overhead view of a module containing two storage assemblies as shown in FIG. 1.

It can be seen that the lids 18 of these two assemblies are assembled via a connector strip 30 arranged on the upper surface 24 of each of the lids. The connector strip 30 is flat and of elongate shape and in the vicinity of each of its ends in its longitudinal direction it comprises an orifice 32 of dimensions mating with those of the centring pin 28 of the strip of the lid 14. The length of the strip is evidently greater than the diameter of a storage assembly. In particular, its length is between one and three times the diameter of the assembly. The space between the two orifices 32 is also larger than the diameter of the assembly.

As can be seen in the Figure, the strip is solid but could also comprise hollows and its shape is not fixed.

A description will now be given of the method for connecting a strip onto the lids.

At a first step, the strip 30 is positioned on the lids in particular by positioning each of the orifices 32 on a centring pin 28 of the lids 18 of the energy storage assemblies 10. The centring pins 28 are sized so that they are essentially of the same thickness as the strip.

Once the strip is in place it is welded onto each of the lids by FSW (Friction Stir Welding).

For this welding a friction-stir device is used such as described below. This step of friction-stir welding will be explained after first describing the device used.

The device comprises a body 50 of cylindrical shape extending along an axis of revolution A-A'. The constituent material of the body 50 is steel for example or any type of material of greater hardness than the constituent material of the part to be welded.

The device also comprises a head 51 extending as far as one of the axial ends of the body 50. The head comprises a tip 52 of flattened cone shape and a peripheral shoulder 54 extending over a plane substantially perpendicular to the axis of revolution A-A' of the body 50.

The body 50 and the head 51 of the device are adapted so that they can be driven in rotation about an axis of rotation corresponding to the axis of revolution A-A' of the body 50. During the weld operation the head of the device enters into the material, heating it to a paste. The heating associated with stirring allows welding of the constituent material of the parts to be welded, here the strip 30 and the lid 18. After cooling, the finished weld is obtained.

By means of the device of the invention, the heating of the part is reduced since welding is performed in the paste state. This reduces risks of deterioration of the storage assembly.

The flattened cone shape of the head of the device allows the material to be trapped and thereby limits chip formation. This flattened cone shape also allows the heated material to be directed against the shoulder to re-plug the hole formed by the head of the device as it travels forward.

The device also comprises a motor (not illustrated) to drive the body 50 and head 51 of the device in rotation. For example the motor is capable of rotating the body and head of the device at a rate of between 500 and 5000 rpm, and preferably of 1000 rpm.

Therefore, during this weld step the device 50 is set in operation and it is placed on the assembly so that the axis of revolution A-A' of the tool merges with the axis of symmetry of the assembly. First the device 50 is positioned so that its head 51 covers both the centring pin 28 of the lid and the strip 30 in the vicinity of the orifice 32.

Figure 4A:
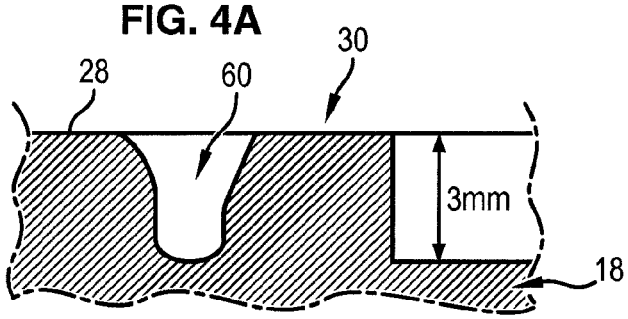
FIGS. 4A and 4B are detailed cross-sectional views of the interfaces of the storage assembly and of a connector strip once welded.

The two parts (strip 30 and centring pin 28) lying flush as illustrated in FIG. 4A, the device 50 is translated along axis A-A' so that it enters almost simultaneously into the two parts. On account of its rotational movement, it locally turns the material to a paste and mixes the material of the strip and of the centring pin. The centring pin 28 and the strip 30 are then welded edge to edge by means of a weld bead 60.

Once the device 50 has entered into the two parts, it is directed so that it moves along the contour of the centring pin 28 after which the device is withdrawn. Once these steps have been performed the material cools and the weld is formed. The bead 60 has the width of the head of the tool i.e. a width of 3 to 5 mm and its pathway is illustrated by the dotted line in FIG. 2.

Figure 4B:
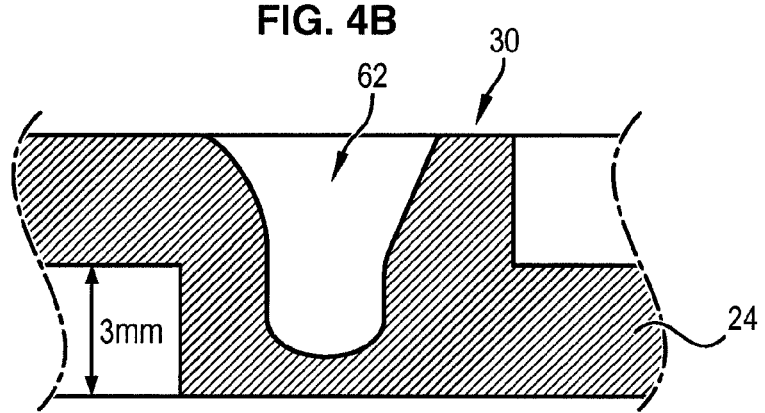

Next, to reinforce the welding of the strip and lid, the device 50 is positioned on the periphery of the strip 30. The head of the device is pressed down so that it passes through the strip after the material thereof has been heated, until it reaches the upper surface 24 of the lid which it also enters. The materials of the lid and strip are also mixed through the movement of the device 50 as can be seen in FIG. 4B, and the device 50 is moved along the periphery of the strip in its part superimposed over the lid. The weld bead 62 also illustrated by a dotted line in FIG. 2 is continuous and may be several centimeters in length.

On completion of the welding of the strip 30 onto a storage assembly 10, the operation is repeated with the other assembly.

The method of the invention is most advantageous since it allows welding without overheating the material and there is therefore no risk of damaging the electrolyte located inside the housing.

In addition, it allows weld beads of larger size to be obtained than with LASER welding, which is of advantage to reduce the electric resistance of the module.

It is noted that the invention is not limited to the described embodiment.

For example, the energy storage assembly is not necessarily such as described above. It may be parallelepiped and non-cylindrical and/or may comprise two lids positioned at each end of an open tube. The lid may also have a flat end surface and not comprise any centring pin as illustrated in the variants in FIGS. 5A to 5C. Other centring mean may optionally replace the centring pin such as protuberances following the outer contour of the strip.

The connector strip may also differ from the description given. It may not have an orifice as illustrated in the variants in FIGS. 5A to 5C. It may also connect two casings together or a casing to a lid.

Figure 5A:
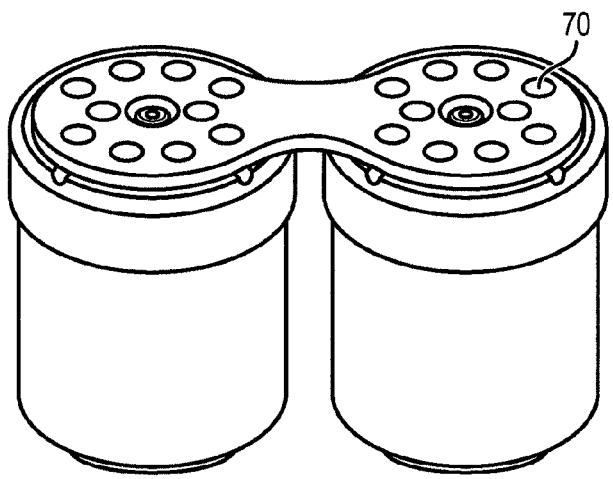
FIGS. 5A to 5C are perspective views of modules according to variants of embodiment of the invention.
Figure 5B:
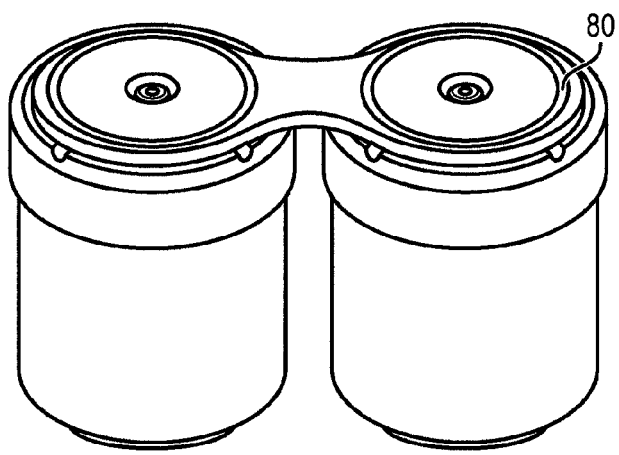
Figure 5C:
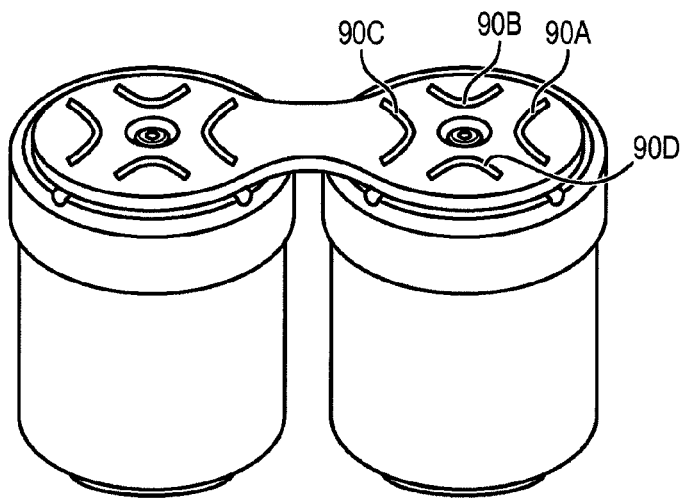

Similarly, the method is not limited to the foregoing description. The strip may only comprise one of the two weld beads described above. It may also be welded to the lid at points other than those described. For example it could be welded using weld spots 70 (as illustrated in FIG. 5A) using a circular continuous weld bead 80 forming a circle of radius equal to about one half of the radius of the lid (as illustrated in FIG. 5B) or using multiple beads 80A, 80B, 80C, 80D that are V-shaped and regularly distributed over the end surface of the lid of an assembly (as illustrated in FIG. 5C). It is noted that in the variants illustrated in FIGS. 5A to 5C the weld beads pass through the strip to reach the lid of the storage assembly and are therefore similar to the bead illustrated in FIG. 4B.

It could also be envisaged to implement a method of the invention using a welding device having a different configuration to the one described.

Finally, a module comprising more than two energy storage assemblies evidently lies within the definition of the invention. The assemblies may also be batteries and/or capacitors, or they may be of different types (one of the assemblies being a battery, the other being a supercapacitor for example).

The invention claimed is:

1. A method for connecting two energy storage assemblies, each energy storage assembly comprising a sealed housing, each housing comprising a tubular element and a lid closing the tubular element at its end, the method comprising:
   - a step of positioning a connector strip on a planar part of two end surfaces of each lid of the two sealed housings placed side by side, said connector strip being sized to be in contact with the end surface of each of the lids;
   - a step of welding the connector strip to each of the lids, wherein the welding is a friction stir welding using a friction-stir device including a body, and a head of said body is placed in contact with the connector strip or in contact with the connector strip and the lid, and by driving in rotation and translating said body along a predetermined axis corresponding to a normal of the end surface, said body enters into the material of the lid and the material of the connector strip in order to weld them and said body is also moved in order to form at least one weld bead between the connector strip and the lid.

2. The method according to claim 1 wherein the connector strip and the lid are welded over a distance at least 1 cm in length.

3. The method according to claim 1 wherein the end surface comprises one or more protuberances forming means for positioning the connector strip thereupon.

4. The method according to claim 3 wherein the means for positioning are formed of a centering pin protruding from the end surface, the connector strip comprising at least one mating orifice which allows the positioning of said connector strip on the centering pin.

5. The method according to claim 1 wherein the lid and the connector strip are superimposed on a contact surface normal to the predetermined axis so that welding passes through the connector strip to reach the lid.

6. The method according to claim 1 wherein the connector strip and the lid are in contact on a contact surface comprising the predetermined axis so that the connector strip and the lid are welded edge to edge.

7. The method according to claim 1 wherein the end surface of the lid is made of a first material, the connector strip is made of a second material different from the first material.

8. A module of at least two energy storage assemblies, each energy storage assembly comprising a sealed housing, each housing comprising a tubular element and a lid closing the tubular element at its end, the energy storage assemblies being connected in pairs by means of a connector strip conforming to the method according to claim 1.

9. The module according to claim 8 wherein the dimensions of at least one weld bead are larger than 3 mm in all directions of the plane of the planar part of the end surface against which the connector strip is positioned.

10. The module according to claim 8 wherein the dimensions of at least one weld bead are larger than 5 mm in all directions of the plane of the planar part of the end surface against which the connector strip is positioned.

* * * * *